United States Patent
Bonnet et al.

(10) Patent No.: US 10,150,199 B2
(45) Date of Patent: Dec. 11, 2018

(54) METHOD AND SYSTEM FOR CONTROLLING AN ORBITAL SANDER

(71) Applicants: Universite De Nantes, Nantes (FR); Centre National de la Recherche Scientifique (CNRS), Paris (FR)

(72) Inventors: Samuel Bonnet, Pont-Saint-Martin (FR); Benoît Furet, Nantes (FR); Sébastien Garnier, Le Rouret (FR); Raphaël Poiree, Feigneux (FR)

(73) Assignees: Universite De Nantes (FR); Centre National de la Recherche Scientifique (CNRS) (FR)

( * ) Notice: Subject to any disclaimer, the term of this patent is extended or adjusted under 35 U.S.C. 154(b) by 34 days.

(21) Appl. No.: 15/124,991

(22) PCT Filed: Mar. 11, 2015

(86) PCT No.: PCT/EP2015/055106
§ 371 (c)(1),
(2) Date: Oct. 28, 2016

(87) PCT Pub. No.: WO2015/136008
PCT Pub. Date: Sep. 17, 2015

(65) Prior Publication Data
US 2017/0095900 A1   Apr. 6, 2017

(30) Foreign Application Priority Data

Mar. 11, 2014   (FR) .................... 14 52006

(51) Int. Cl.
*B24B 49/10*   (2006.01)
*B24B 23/03*   (2006.01)
*B24B 49/16*   (2006.01)
*G05B 19/404*  (2006.01)
(Continued)

(52) U.S. Cl.
CPC .......... *B24B 23/03* (2013.01); *B24B 27/0038* (2013.01); *B24B 49/16* (2013.01);
(Continued)

(58) Field of Classification Search
CPC ..................................................... B24B 49/10
(Continued)

(56) References Cited

U.S. PATENT DOCUMENTS 5,067,085 A * 11/1991 Wenzel ................ B25J 9/1684
700/164
5,077,941 A * 1/1992 Whitney ................ B24B 19/26
451/11

(Continued)

FOREIGN PATENT DOCUMENTS

DE   3310729 A1   9/1984
FR   2828424 A1   2/2003
FR   2881068 A1   7/2006

OTHER PUBLICATIONS

French Search Report for Application No. 1452006 dated Jan. 21, 2015.
(Continued)

*Primary Examiner* — Robert Rose
(74) *Attorney, Agent, or Firm* — Lerner, David, Littenberg, Krumholz & Mentlik, LLP (57) ABSTRACT

The invention relates to a method for controlling an automated orbital sander, in which method an electrically powered orbital sander is moved around automatically, at constant pressure, over the surface of an object, along at least one predefined sanding path so as to perform sanding, characterized in that the instantaneous power consumed by the sander along the sanding path is measured and in that the measurement thus taken is processed in order to deduce therefrom information regarding the level of abrasion along (Continued)

said path and/or to detect any sanding incident that has occurred along the latter.

8 Claims, 8 Drawing Sheets

(51) Int. Cl.
  *G05B 19/4065* (2006.01)
  *B24B 27/00* (2006.01)
(52) U.S. Cl.
  CPC ....... *G05B 19/404* (2013.01); *G05B 19/4065* (2013.01); *G05B 2219/2627* (2013.01); *G05B 2219/37367* (2013.01); *G05B 2219/45058* (2013.01)
(58) Field of Classification Search
  USPC .......................................... 451/5, 8–10, 357
  See application file for complete search history.

(56) References Cited

U.S. PATENT DOCUMENTS

| | | | | |
|---|---|---|---|---|
| 5,299,389 | A | * | 4/1994 | Yonaha .................. B25J 9/1684 451/11 |
| 5,509,847 | A | * | 4/1996 | Jinno ...................... B24B 27/04 451/11 |
| 2004/0217873 | A1 | | 11/2004 | Schweitzer et al. |
| 2007/0031024 | A1 | * | 2/2007 | Albeck ............ G05B 19/41875 382/141 |

OTHER PUBLICATIONS

International Search Report for Application No. PCT/EP2015/055106 dated Jun. 15, 2015.

* cited by examiner

METHOD AND SYSTEM FOR CONTROLLING AN ORBITAL SANDER

CROSS REFERENCE TO RELATED APPLICATIONS

The present application is a national phase entry under 35 U.S.C. § 371 of International Application No. PCT/EP2015/055106, filed Mar. 11, 2015, published in French, which claims priority from French Patent Application No. 1452006, filed Mar. 11, 2014, the disclosures of which are incorporated by reference herein.

The invention relates to orbital sanding techniques.

Advantageously, it finds application in the nautical, wind turbine, land or aeronautical transport, for sanding parts of large dimensions, of course other applications may be contemplated.

GENERAL TECHNICAL FIELD AND PRIOR ART

In most industrial fields, the preparation of a mechanical surface by abrasion, i.e. sanding or polishing, is mainly achieved by means of portable devices. These manual tasks are tedious (repetitive gestures causing musculoskeletal disorders). Because of a significant difference of the financial sums associated with the required qualified labor between so-called "industrialized" countries and so called "low cost" countries, they have a consequent impact on the price cost of the final product. Although many production operations like trimming, or piercing are today automated, the surface preparation by abrasion is not automated or very little because of the absence of technological solutions for replacing sensitive control (visio-tactile or felt) of the operator who adjust in real time its operating conditions (mainly trajectory or supporting force).

In order to respond to these problems, laboratories and industrialists have developed robot or automated solutions for sanding based on a partial control of the operating parameters:

The rotating portion (spindle or sander motor) gives the possibility of imposing the speed of rotation.

The trajectories are imposed by programming (computer-aided manufacturing (CAM) software) over the whole of the surface of the part to be treated.

Different automated systems for managing the forces (compliance, either mechanical or electronic, passive or active), installed at the end of robots, may ensure a fixed force but more or less constant.

However, certain specificities of this method have consequences on the uniformity and the capability of predicting the actual work of the tool on the part;

The wear of the abrasive, and therefore the abrasion efficiency cannot be neglected, especially as soon as the sanded surface requires several changes of abrasive.

Certain accidental events also perturb the efficiency of the abrasion:

sudden change in the curvature of the part, trajectory defect of the robot, fouling of the abrasive . . . .

Thus, the presently proposed solutions are not adapted and require a non-negligible time for controlling a posteriori the surface of the part by an operator and in many cases, local reworking due to incidents during the automated method. These time losses have consequences on the cost efficiency of the automation and may slow down investment of potential users. Further, on parts with large dimensions with strong added value, the consequences generated by a poorly controlled method are not acceptable.

Starting with preliminary working operations, in the field of machine tools it has already been proposed to control the operating condition of a machining tool, and notably its wear, by comparing the active power absorbed by its motor to thresholds or further to reference curves established during first machining.

Examples in this sense were for example proposed in patent applications FR 2 828 424 and FR 2 881 068.

The techniques described in these applications are proposed within the scope of tools allowing rough machining (piercing bit for example) and are not adapted to the tracking of orbital sanding.

PRESENTATION OF THE INVENTION

An object of the invention is to propose a method and control system which allows monitoring of the quality of the abrasion achieved by an orbital sander.

Another object of the invention is to propose a method and a control system which allows mapping of the quality of an orbital sanding operation.

Further another object of the invention is to propose a control system which allows the detection of incidents during an orbital sanding operation.

Figure 1:
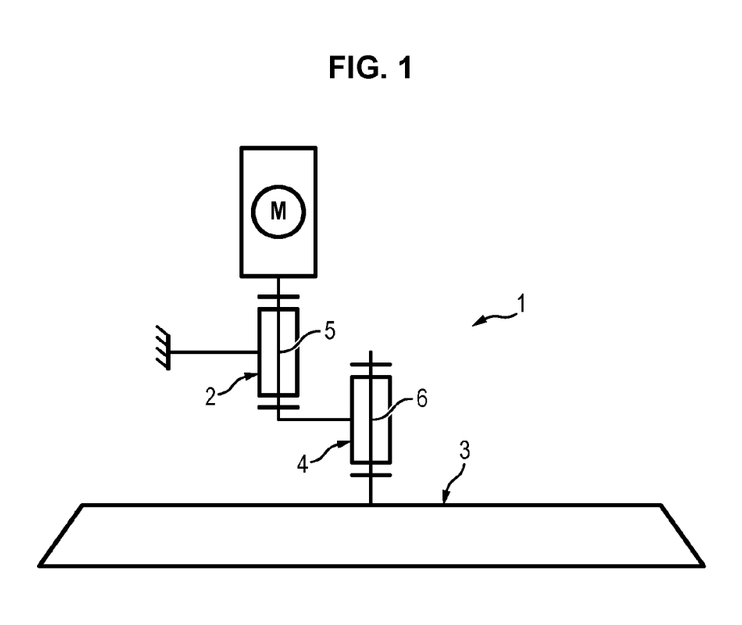
FIG. 1, already discussed, schematically illustrates the kinematical structure of a rotating machine for orbital sanding.

The cinematic structure of an orbital sander is schematically illustrated in FIG. 1. Such a sander is a rotating machine which includes a motor M, an eccentric 2 bound to the shaft of the motor M and a sanding plate 3 attached on the eccentric 2 through a pivot connection 4.

The thereby illustrated machine therefore includes two axes:

one 5 which is the driven rotation axis of the eccentric 2, the other one 6 which is the free axis of rotation of the sanding plate 3.

For any rotating machine with an electrical power supply, the absorbed power is linearly related to the resistive torque (friction, plastic deformation of the micro-shavings) and therefore during a sanding operation, to the abrasion rate of the tool on the surface. This resistive torque and the absorbed power depend on the material, on the abrasive, on the applied pressure on the surface and on the cutting speed of each grain.

Diverse compliance systems give the possibility of managing the force so that the pressure applied to the surface is substantially constant (dispersion around the targeted value of the order of a few Newtons).

As for the cutting speed, the inventors ascertained that in the case of an orbital sander, the average cutting speed of each grain remains not very variable in a relatively extending range of forces (or pressures) (of the order of a few tens of Newtons for an abrasive plate of a diameter of 150 mm and therefore compatible with the capacities of a system for managing forces by compliance).

Thus, all the operating parameters (material, abrasive, characteristics of the motor, cutting speed and pressure applied on the surface) may be considered as stable during an automated orbital sanding operation.

Figure 2:
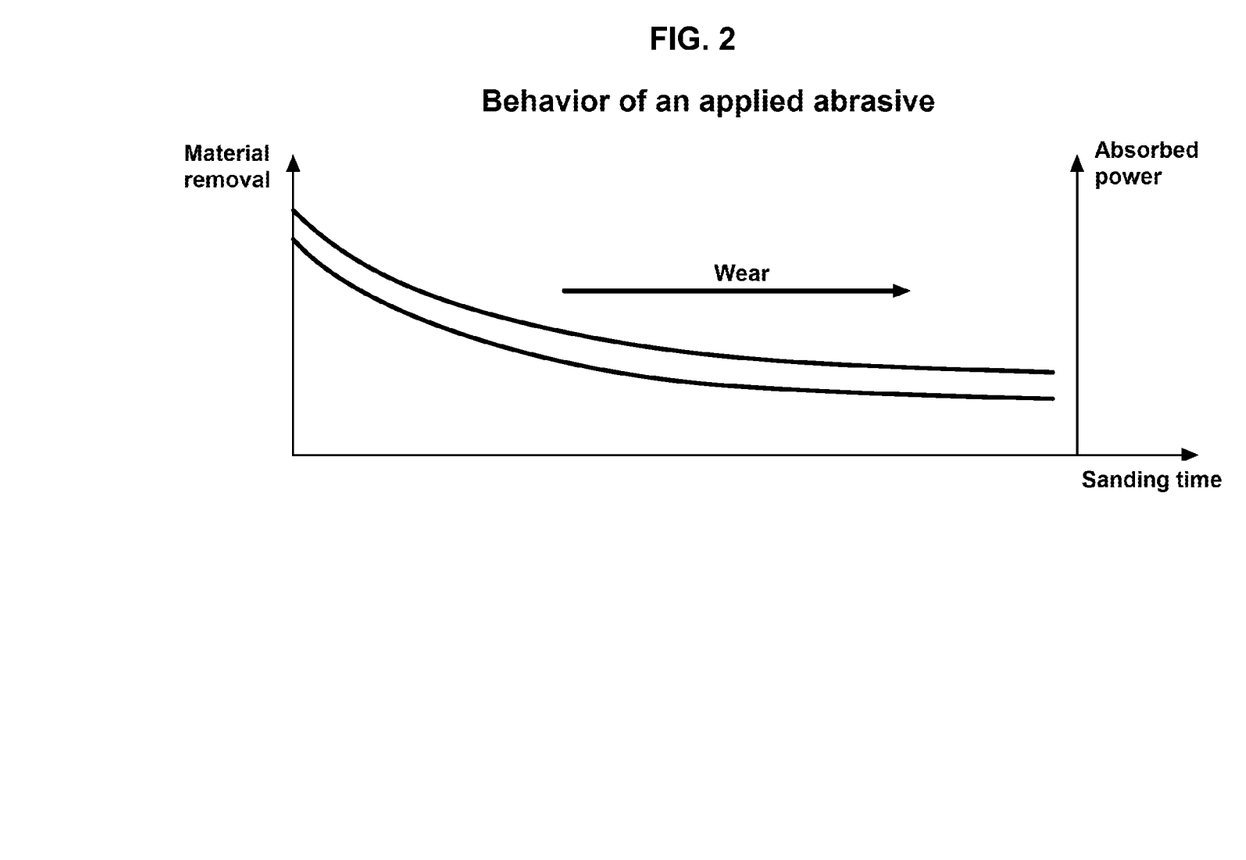
FIG. 2 is a graph on which is plotted both the time-dependent change in the absorbed power versus the sanding time and the time-dependent change in the removal of the material.

As illustrated by FIG. 2, the absorbed power is then linearly proportional to the abrasion rate of the surface in the normal range of use.

Any change in this linearity during the working operation can only be the result of an incident.

Consequently, only the wear of the abrasive and random events (fouling, detachment, loss of the material contact or on the contrary sudden contact with the material) may influence the abrasion level and therefore the absorbed power level. Therefore, monitoring the absorbed power gives the possibility of monitoring the abrasion work.

Thus, the invention proposes a method for controlling automated orbital sanding, wherein an electrically-powered orbital sander is moved in an automated way, at constant pressure, at the surface of an object, along at least one predefined sanding trajectory in order to achieve the sanding thereof, characterized in that the instantaneous consumed power of the sander is measured along the sanding trajectory and in that the thereby conducted measurement is treated so as to infer therefrom a piece of information on the abrasion level along said trajectory and/or to detect a possible sanding incident along the latter.

According to an embodiment, the curve of the time-dependent change in the instantaneous consumed power or curves function of the latter are compared with one or several curves, thresholds or reference patterns characteristic of the occurrence of different incidents, these different reference curves or thresholds having been determined beforehand during a calibration phase.

Notably, it is advantageously possible to make up beforehand a database in which different curves and/or different thresholds and/or reference patterns are stored in memory for different types of materials to be sanded and different types of abrasives which may be used for their sanding.

The treatment of the instantaneous consumed power measurement for example allows detection at any instant along the trajectory an abrasion defect and/or a wear level of the abrasive of the sander and/or an applied pressure incident on the abrasive of the sander and/or a fouling incident and/or a suction incident and/or a detachment or absence of abrasive incident.

Such a detection may trigger in real time an action as a response.

According to an aspect of the proposed method, it is possible to display or to edit; with a colorimetric scale, the instantaneous consumed power and/or the estimated abrasion level.

Alternatively or additionally, it is possible to display or edit a colorimetric mapping or any other method for representing the instantaneous consumed power and/or of the estimated abrasion level. The colorimetric mapping may be a simplified mapping.

The invention also proposes a system for controlling an automated orbital sanding achieved by means of an electrically-powered orbital sander moved in an automated way, at constant pressure, at the surface of an object, along at least one predefined sanding trajectory in order to achieve sanding thereof, characterized in that it includes a device for measuring the instantaneous consumed power of the sander and a monitoring controller adapted for receiving the thereby measured instantaneous power and for treating the thereby achieved measurement in order to infer therefrom a piece of information on the abrasion level along said trajectory and/or detect a possible sanding incident along the latter.

An automated orbital sanding system is further proposed, which includes such a control system.

PRESENTATION OF THE FIGURES

The following description is purely illustrative and non-limiting. It should be read with reference to the appended figures wherein.

DETAILED DESCRIPTION OF SEVERAL EMBODIMENTS AND THEIR APPLICATION

Figure 3:
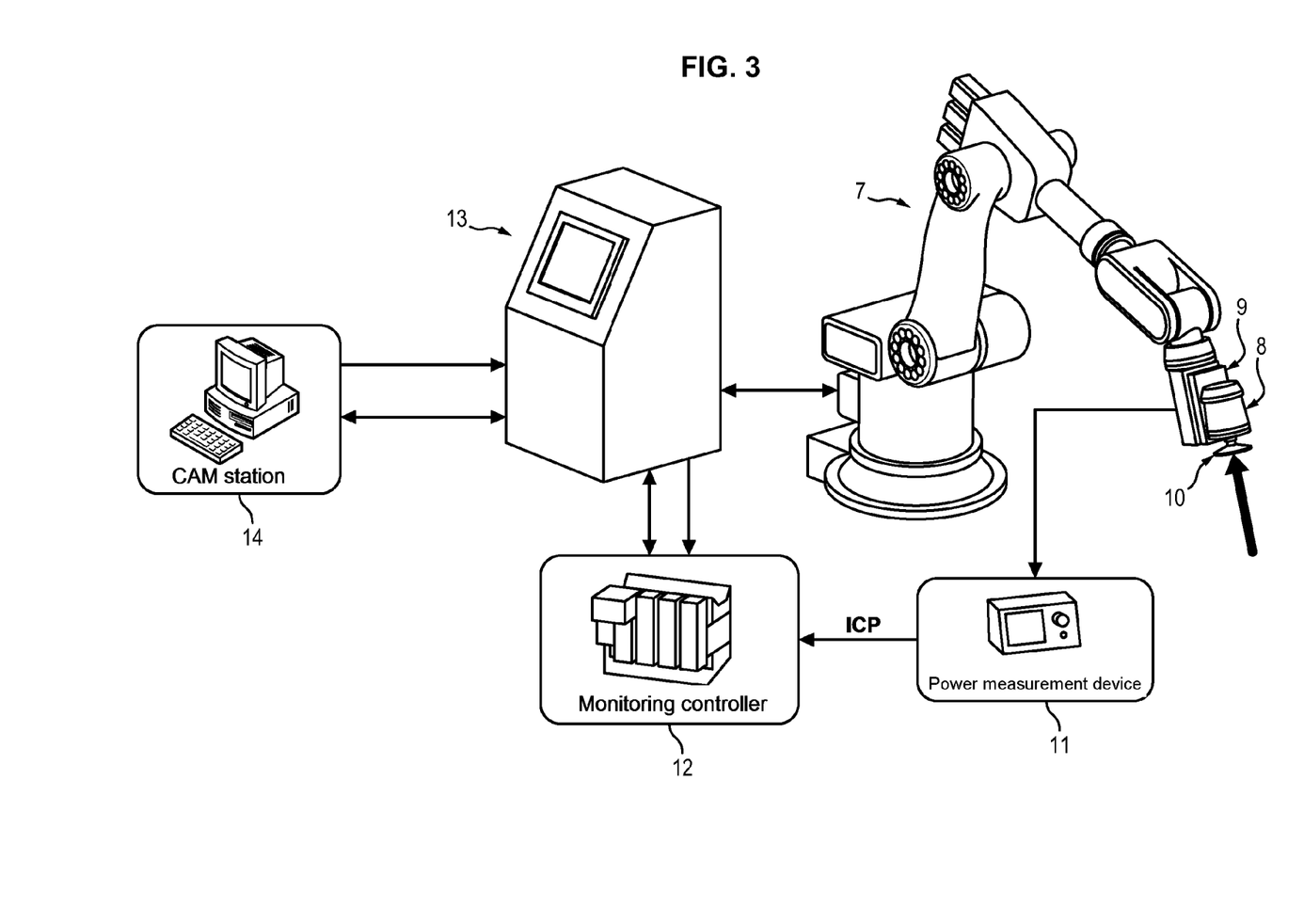
FIG. 3 schematically illustrates a sanding system integrating a monitoring controller according to a possible embodiment of the invention.

The instrumented system illustrated in FIG. 3 as for it includes a jointed robot arm 7 on which is mounted a sander 8 with an orbital movement which is of the type of the one illustrated in FIG. 1.

A compliance system 9 gives the possibility of maintaining a constant force between the 10 mounted on the plate of the rotating machine and the part to be sanded (arrow in FIG. 3).

The size of the plate of the sander 8—and therefore of the abrasive disc 10—is adapted to the curvature of the part. Further, the use of a foam interface gives the possibility of uniformizing the contact pressure between the part to be sanded and the abrasive 10.

The power characteristics of the motor of the sander are dimensioned, like its working speed of rotation, in order to allow operation under permanent conditions (stable conditions) by applying the targeted pressure n the abrasive tool 8, 10.

A device for measuring power 11 permanently measures the instantaneous consumed power ICP of the motor of the sander 8 by analyzing the electric power supply of the latter. The thereby measured power is transmitted to a monitoring controller 12 which exchanges with a control unit 13, which controls the jointed robot arm 7.

Said control unit 13 controls the displacement of the robot arm 7 and of the sander 8 which it bears according to pre-calculated trajectories at a treatment station 14, which is for example a remote station or a station with which said unit 13 exchanges in real time.

The device for measuring power 11 may be of any known type being connected on the single-phase or three-phase electric power supply of the rotating machine which makes up the sander 8.

It transmits to the monitoring controller 12 a signal of 0-10 V or 4-20 mA corresponding to the instantaneous consumed power ICP.

Figure 4:
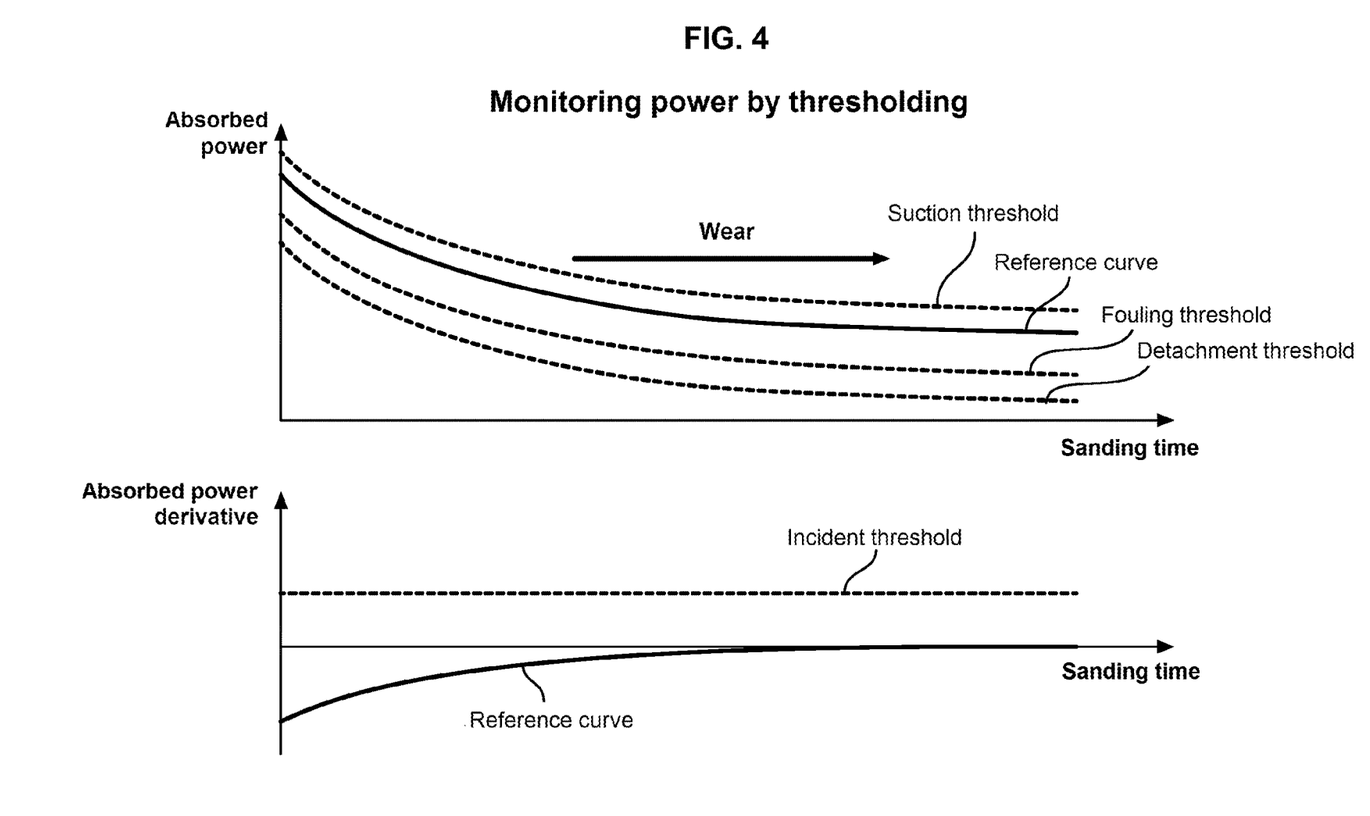
FIG. 4 is a graph on which is plotted the time-dependent change in the absorbed power and of its derivative versus the sanding time, as well as different curves corresponding to different characteristic thresholds (detachment threshold, fouling threshold, suction threshold, incident threshold)

The thereby achieved power measurements versus the sanding time give the possibility, by comparison with the threshold curves calibrated beforehand, of detecting different incidents as to the operation of the sanding machine and of the method per se (FIG. 4).

This comparison treatment is applied by the monitoring controller 12 associated with the controller 13 of the robot.

The threshold curves used for this comparison are determined during calibration phases beforehand. Each curve is characteristic of a particular incident:
lack of suction of the tool,
fouling of the abrasive paper,
detachment of the abrasive paper,
etc. . . . .

Comparisons may also be applied on other functions of the absorbed power. For example, the derivative of the absorbed power may itself be compared with a calibration curve, with one or several thresholds or further with curve pattern(s) for detecting a possible incident on the operation of the machine.

The different calibration curves used in these comparison treatments depend on the main characteristics of the monitored application: sanded material, speed and force used, type of sander, type of abrasive paper and in particular the grain size of the latter, etc . . . .

They are transmitted by the station 14 to the unit 13, as well as by said unit 13 to the monitoring controller 12 which is associated with it, with the 3D files providing the trajectory of displacement of the robot arm 7 and of the sander 8.

The monitoring software integrated to the monitoring controller 12 thus collects different pieces of information:
the ICP signal of the absorbed power (instantaneous consumed power)
position of the tool (sander 8) relatively to the part to be sanded,
a 3D numerical model of the part (3D file provided to the controller 13 of the robot)
preliminary calibration data From real time or post-treatment synchronized data, the display device of the robot 13 may inform the operator relatively to possible sanding incidents and to their localization on the part.

The monitoring controller software 12 may also communicate with the controller 13 of the robot in order to cause an action in response (modification of the operating conditions, change of abrasive tool, putting the operation into a wait state, request of human intervention or another action).

Figure 5:
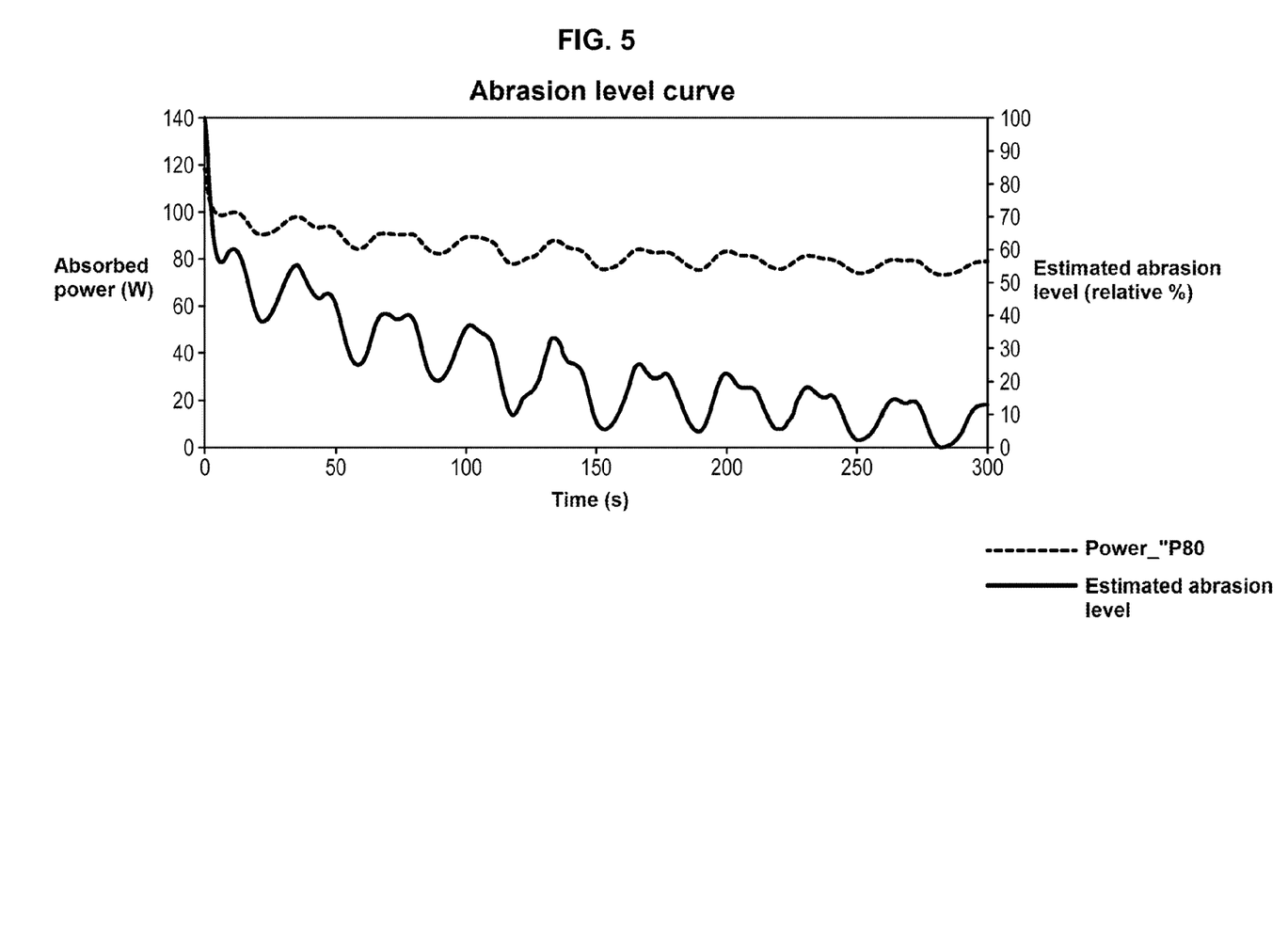
FIG. 5 is a graph on which are plotted the absorbed powers and the estimated abrasion levels associated with a colorimetric scale.

Also, this synchronization and the association of the absorbed power levels with a colorimetric scale gives the possibility of mapping the estimated abrasion operation on the part and of for example displaying for the operator the absorbed power and the estimated abrasion level by displaying them relatively to a colorimetric scale (FIG. 5) or another type of representation.

Figure 6:
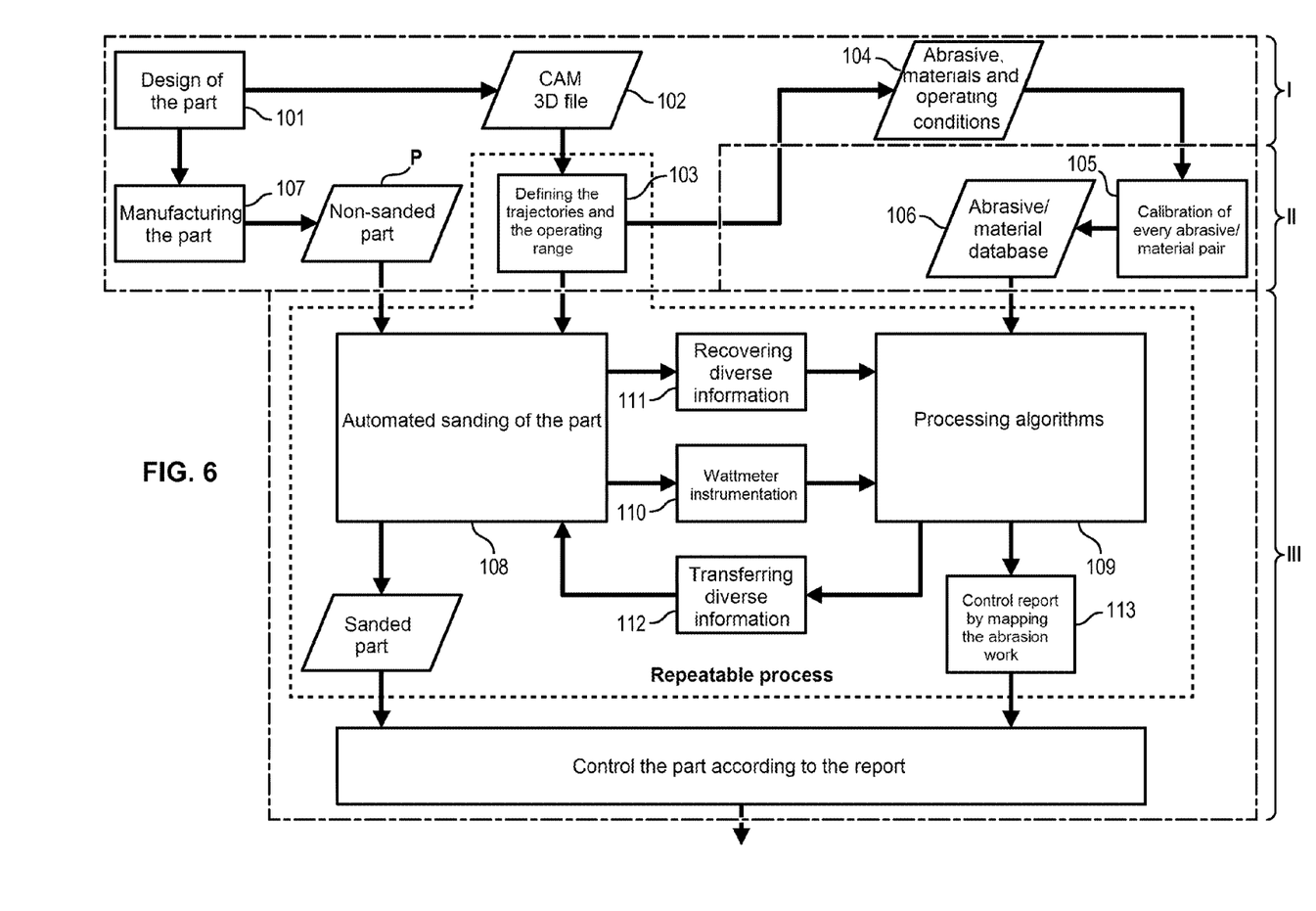
FIG. 6 illustrates different steps of a possible embodiment for a method according to the invention.

The great steps of a monitoring treatment of an automated sanding operation are illustrated in FIG. 6.

In a first phase (phase I), the manufacturing range is designed and defined.

For this purpose, the design 101 of the part provides a 3D CAM file 102 from which are computed the trajectories of the operating range of the sander 8 with orbital movement (step 103).

This computation provides the type of abrasive as well as the operating conditions which have to be used (data 104).

A calibration phase (II) gives the possibility, for each (abrasive)/(sanded material) pair, of determining the different threshold curves corresponding to the different incidents which one wishes to be able to follow (step 105). These curves are loaded in a reference database 106.

During the automated sanding (phase III), the automated system described with reference to FIG. 3 treats the part to be sanded P manufactured during phase I (manufacturing step 107). It achieves automated sanding of the part P (step 108) according to the trajectories and to the operating range determined during step 103. It applies optional treatment algorithms (step 109), modifying the operating conditions of the robot arm 7 according to comparisons made with the reference curves provided by the database 106, as well as according to the return of absorbed power provided by the power measurement device 11 (instrumentation 110) and on possible other pieces of information (external control—recovery of diverse information 111). For this purpose, diverse pieces of information are transmitted by the monitoring controller 12 to the controller 13 which controls the robot arm 7 (step 112) for controlling these modifications of operating conditions.

Mappings providing the operator with a view of the sanding work on the part may also be edited or displayed either at the end of the sanding operation, or also in real time (step 113). These mappings allow the operator to control the sanding of the part and either the validation or not of the latter. If necessary, the operator may decide to resume sanding of certain parts (resuming the process by redefining the trajectories).

Figure 7:
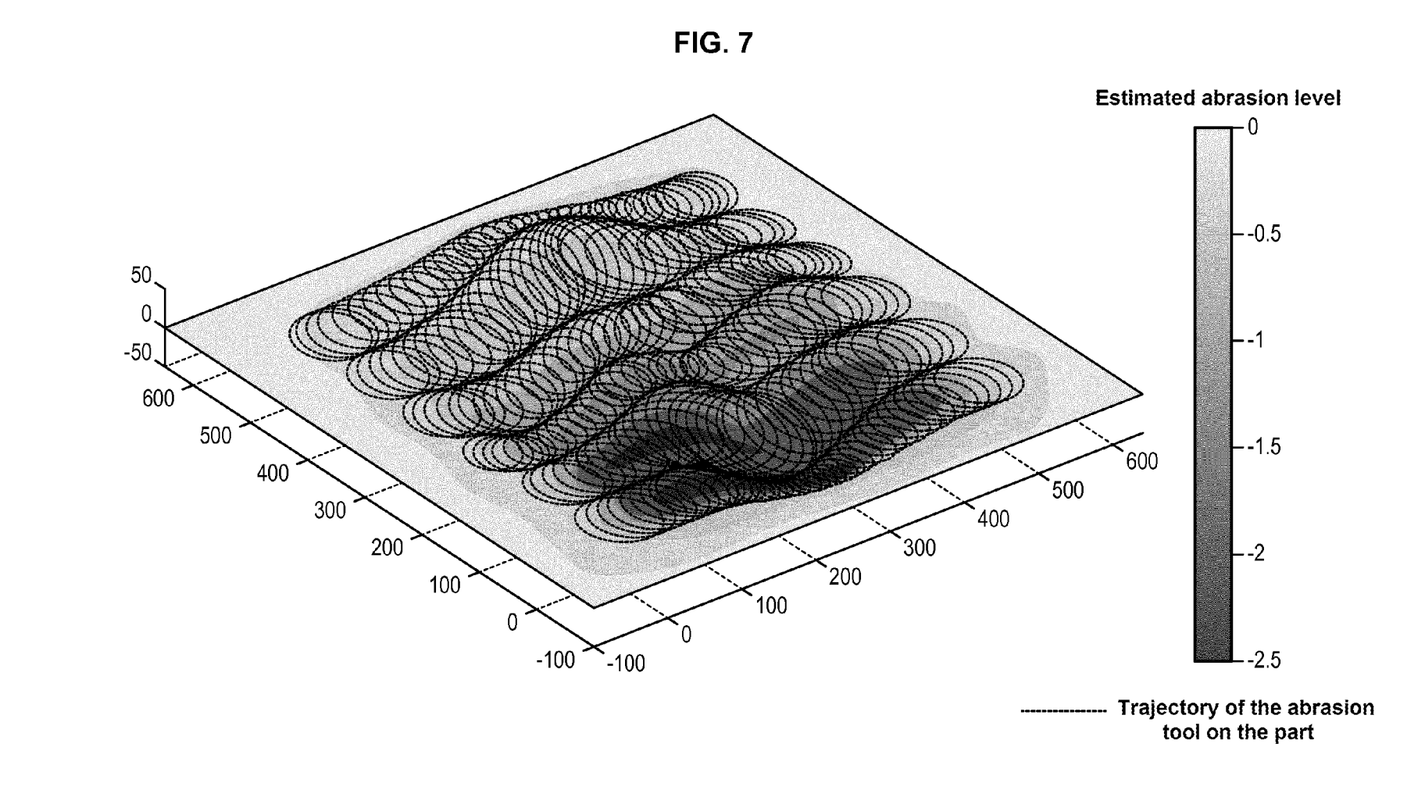
FIGS. 7 and 8 illustrate examples of mappings which may be obtained within the scope of the method illustrated in FIG. 7.

In FIG. 7, the trajectories of the sander 8 on the part are associated with a mapping with a colorimetric scale or with any other type of representation which indicates to the operator the areas where sanding has been achieved in an optimum way and the areas where the abrasion level was particularly low. This mapping associates an instantaneous consumed power of the sander with a given position of the sanding trajectory.

This display or an edition of this mapping then allows the operator to optimize the changes of tools and the sanding strategies relatively to the shapes of the part.

Figure 8:
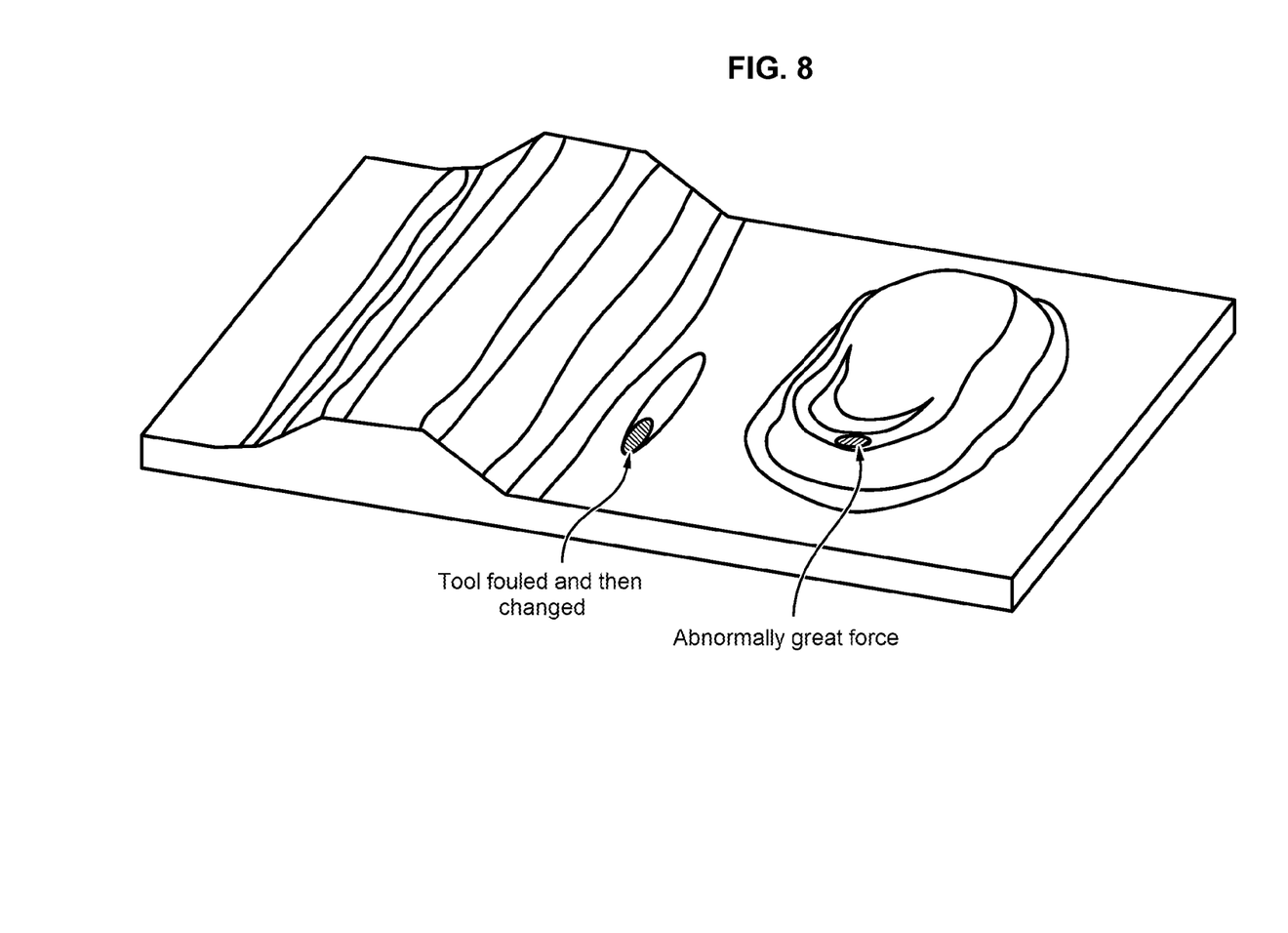

A second example in FIG. 8 illustrates a simplified view of the estimated abrasion levels. This version facilitates analysis and the decision made by an operator for localizing potential resumption areas. It also gives the possibility of specifying incidents with or without any corrective action of the automated cell. Thus, this viewing mode gives the possibility of avoiding systematic and thorough control of the quality of the whole surface of the part sanded by the operator.

A projection of the image on the part, with a video-projector or a laser, may be contemplated, especially in the case of parts with very large dimensions.

The invention claimed is:

1. A method for controlling automated orbital sanding, wherein an electrically-powered orbital sander is moved in an automated way, at constant pressure, at the surface of an object, along at least one predefined sanding trajectory in order to achieve the sanding thereof,
wherein the instantaneous consumed power of the sander is measured at different points along the sanding trajectory and in that the thereby conducted measurement is treated so as (i) to infer therefrom a piece of information on the abrasiveness of the object at each of the different measured points along said trajectory, (ii) to detect a possible sanding incident along the latter, or both, and
wherein a colorimetric mapping of the instantaneous consumed power, the inferred abrasiveness, or both, at the different points along the sanding trajectory is displayed or edited, said mapping associating an instantaneous consumed power of the sander with a given position of the sanding trajectory.

2. The method according to claim 1, wherein the curve of the time-dependent change in the instantaneous consumed power or curves function of the latter are compared with one or several curves, thresholds or reference patterns characteristic of the occurrence of different incidents, these different reference curves or thresholds having been determined beforehand during a calibration phase.

3. The method according to claim 2, wherein a database is made up beforehand in which any one or combination of different curves, different thresholds and reference patterns are stored in memory for different types of materials to be sanded and different types of abrasives which may be used for their sanding.

4. The method according to claim 1, wherein the treatment of the instantaneous consumed power measurement, its time-dependent change, or both are adapted for detecting at any instant along the trajectory either (i) any one or combination of an abrasion defect, a wear level of the abrasive of the sander, an applied pressure incident on the abrasive of the sander, a fouling incident, a suction incident, and a detachment, or (ii) absence of abrasive incident.

5. The method according to claim 4, wherein such a detection triggers in real time an action in response.

6. The method according to claim 1, wherein the instantaneous consumed power, the inferred abrasiveness, or both, are displayed or edited with a colorimetric scale.

7. A system for controlling an automated orbital sanding achieved by means of an electrically-powered orbital sander moved in an automated way, at constant pressure, at the surface of an object, along at least one predefined sanding trajectory in order to achieve sanding thereof, wherein it includes a device for measuring the instantaneous consumed power of the sander at different points along the sanding trajectory and a monitoring controller adapted for receiving the thereby measured instantaneous power and for treating the thereby achieved measurement in order to (i) infer therefrom a piece of information on the abrasiveness along said trajectory, (ii) detect a possible sanding incident along the latter, or both, said system including means to display or edit a colorimetric mapping of the instantaneous consumed power, the inferred abrasiveness, or both, as measured at different points along the sanding trajectory, said mapping associating an instantaneous consumed power of the sander with a given position of the sanding trajectory.

8. An automated orbital sanding system including an electrically-powered orbital sander and a robot adapted for moving said sander in an automated way, at constant pressure, at the surface of an object, along at least one predefined sanding trajectory in order to achieve the sanding thereof, wherein it includes a control system according to claim 1.

* * * * *